United States Patent [19]

Baum et al.

[11] Patent Number: 5,667,755
[45] Date of Patent: Sep. 16, 1997

[54] HYBRID COMPOSITE CENTRIFUGE CONTAINER WITH INTERWEAVING FIBER WINDINGS

[75] Inventors: Samuel Baum, Redwood City; Bradley D. Carstens, Mountain View, both of Calif.; Stephan J. Glen, Grants Pass, Oreg.

[73] Assignee: Beckman Instruments, Inc., Fullerton, Calif.

[21] Appl. No.: 438,899

[22] Filed: May 10, 1995

[51] Int. Cl.$^6$ ................................................. B04B 5/02
[52] U.S. Cl. .......................... 422/101; 436/177; 494/16
[58] Field of Search .......................... 422/102, 72, 101; 436/177; 494/16

[56] References Cited

U.S. PATENT DOCUMENTS

| | | | |
|---|---|---|---|
| 3,047,191 | 7/1962 | Young | 220/83 |
| 4,483,214 | 11/1984 | Mayer | 74/572 |
| 4,738,656 | 4/1988 | Piramoon et al. | 494/81 |
| 4,781,669 | 11/1988 | Piramoon | 494/16 |
| 4,790,808 | 12/1988 | Piramoon | 494/81 |
| 4,824,429 | 4/1989 | Keunen et al. | 494/16 |
| 4,860,610 | 8/1989 | Popper et al. | 74/572 |
| 5,057,071 | 10/1991 | Piramoon | 494/16 |
| 5,362,301 | 11/1994 | Malekmadani et al. | 494/16 |
| 5,382,219 | 1/1995 | Malekmadani | 494/16 |
| 5,411,465 | 5/1995 | Glen et al. | 494/16 |

FOREIGN PATENT DOCUMENTS

WO93/08675  4/1993  WIPO .................. B04B 5/04

Primary Examiner—Lyle A. Alexander
Attorney, Agent, or Firm—William H. May; Paul R. Harder; Kenneth C. Brooks

[57] ABSTRACT

A hybrid fiber-composite centrifuge container having a cylindrical metal sleeve, with a smooth inner surface permanently coupled to the fiber reinforced base. The reinforced base has an open end, a closed end and a cylindrical wall extending between the closed and open ends, with the metal sleeve coupled to the cylindrical wall proximate to the open end forming a sleeve-base interface. The base is formed from a plurality of layers of fiber material wound helically and circumferentially about the axis of the base. Among the plurality of layers of fiber material is a lane-change feature which provides a uniform outer diameter to the cylindrical wall that is coextensive with the interface. The uniform outer diameter helps prevent uncoiling of the plurality of layers of fiber material during centrifugation.

7 Claims, 5 Drawing Sheets

HYBRID COMPOSITE CENTRIFUGE CONTAINER WITH INTERWEAVING FIBER WINDINGS

TECHNICAL FIELD

The present invention pertains to the field of centrifugation. Specifically, the present invention pertains to a centrifuge container for supporting a sample in a centrifuge rotor.

BACKGROUND ART

Centrifuges are commonly used in medical and biological industries for separating and purifying materials of differing densities, such as viruses, bacteria, cells and proteins. A centrifuge includes a rotor and a container to support a sample undergoing centrifugation. The rotor is designed to hold the sample container while it spins at 3,000 to 120,000 revolutions per minute.

Two requirements for the centrifuge rotor and sample container have historically been in conflict: strength and weight. That is, the centrifuge rotor and sample container must have the requisite strength to resist forces associated with centrifugation and should be manufactured from the lightest weight materials available. At first, centrifuge rotors and sample containers were constructed from metal alloys, such as steel, which provided acceptable strength. However, the weight associated with these metals subjected the load bearing sections to forces that limited their operational life. In addition, the centrifuge time of a sample in the heavy rotors were protracted due to a the limited speed of the rotor, as well as the protracted acceleration and deceleration times which are a function of the rotor's moment of inertia.

Early attempts to overcome the aforementioned drawbacks, resulted in manufacturing rotors and sample containers from alternative metals, such as titanium and aluminum. However, these materials are proving too heavy to obtain the desirable weights and speeds for modern medical practices and biological research. In addition, these materials are costly to machine, resulting in a sharp increase in the costs of a centrifuge system.

Fiber reinforced centrifuge rotors and sample containers have overcome many of the drawbacks of past centrifuge components. These rotors are stronger and lighter than metal rotors and provide a much smaller moment of inertia, as well as higher maximum speeds. U.S. Pat. No. 5,362,301 to Malekmadani et al. discloses a fixed angle all composite centrifuge rotor. The rotor includes a plurality of slots equally spaced about the circumference of the rotor, with reinforcement cups placed therein. The cups are formed of a plurality of helically wound fibers which are dipped in an epoxy matrix.

U.S. Pat. No. 5,382,219 to Malekmadani discloses a fixed angle all composite centrifuge rotor including a plurality of tube holders equally spaced about the circumference of the rotor. Each of the tube holders a formed from a plurality of helically and circumferentially wound layers of fiber material dipped in an epoxy matrix.

The all fiber reinforced holders are incompatible for providing close tolerance fittings which often requires machining, or grinding, of the fiber reinforced surface. This degrades the fiber reinforced material and leads to a reduced operational life and/or complete failure of the holder during centrifugation. Often when close tolerance fittings are required, a separate container is placed in the holder, such as a plastic or metal centrifuge tube or bottle. This increases the weight and creates problems associated with earlier centrifuge components. Recent attempts have been made to address this problem. In PCT application No. PCT/US92/09104 to Beckman Instruments, Inc., a hybrid centrifuge container is disclosed which provides a durable light weight sample holder capable of being machined to close tolerances. The container includes a fiber reinforced base having an open end and a closed end, with a metal sleeve attached to the open end.

An object of the present invention is to provide a hybrid centrifuge container capable of being machined to close tolerances and that is lighter than the containers of the prior art and has a substantially longer operational life.

SUMMARY OF THE INVENTION

This object has been achieved by having a centrifuge container that includes a cylindrical metal sleeve, having a smooth inner surface facing the fiber-composite base, forming a sleeve-base interface. For purposes of this application, a smooth surface is defined as a surface that is devoid of grooves, channels and ridges. A smooth surface may, however, include textured and polished surfaces. The metal sleeve is permanently coupled to the base to distribute load forces, present on the base during centrifugation, about the circumference of the base. The sleeve also shields the base from a frictional force applied tangential to the base's circumference. The fiber-composite base is formed from a plurality of layers of fiber material wound double-helically and circumferentially about the axis of the base. The base includes a lane change feature to prevent uncoiling of the plurality of layers of fiber material during centrifugation and for providing the portion of the base coextensive with the interface with a uniform diameter to facilitate distributing load forces about the circumference of the base. The base resists deformation and yielding due to hydrodynamic pressures associated with centrifugation of liquids contained in it. In another embodiment, the perimeter of the open end, and one end of the metal sleeve, lie along a common plane, with the perimeter extending inwardly and downwardly toward the axis of the container, defining an angled portion. This design protects the open end of the fiber-composite base from abrasion.

BEST MODE OF CARRYING OUT THE INVENTION

Figure 1:
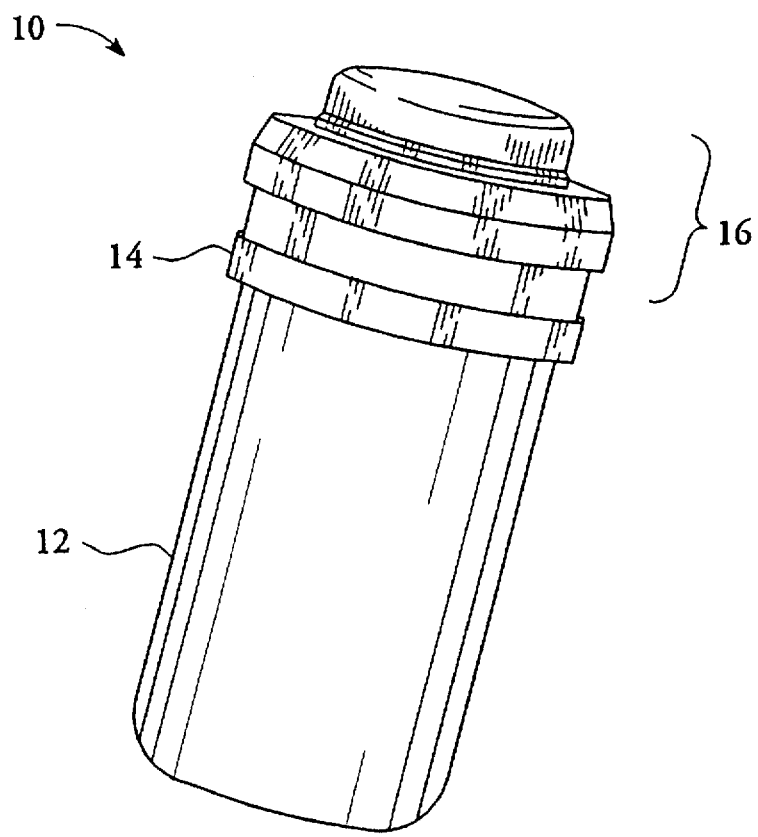
FIG. 1 is a perspective view of a hybrid fiber-composite centrifuge container, in accord with the present invention.

FIG. 1 shows the hybrid centrifuge container 10 of the present invention as including a fiber-composite base 12 and a metal sleeve 14. Atop of the metal sleeve 14 is a closure dome 16. Although a hermetic seal may be formed, the closure dome 16 generally provides a liquid-tight seal to the container 10. Typically, the sleeve 14 is pre-machined from a lightweight metal such as an aluminum alloy and functions to distribute load forces present about the circumference of the fiber composite base, discussed more fully with respect to FIG. 4. In addition, the metal sleeve 14 shields the base from a frictional force applied tangential to the base's circumference, e.g., screwing or snapping a lid onto the container 10, or machining of the sleeve subsequent to attaching the sleeve onto the fiber-composite base 12.

Figure 2:
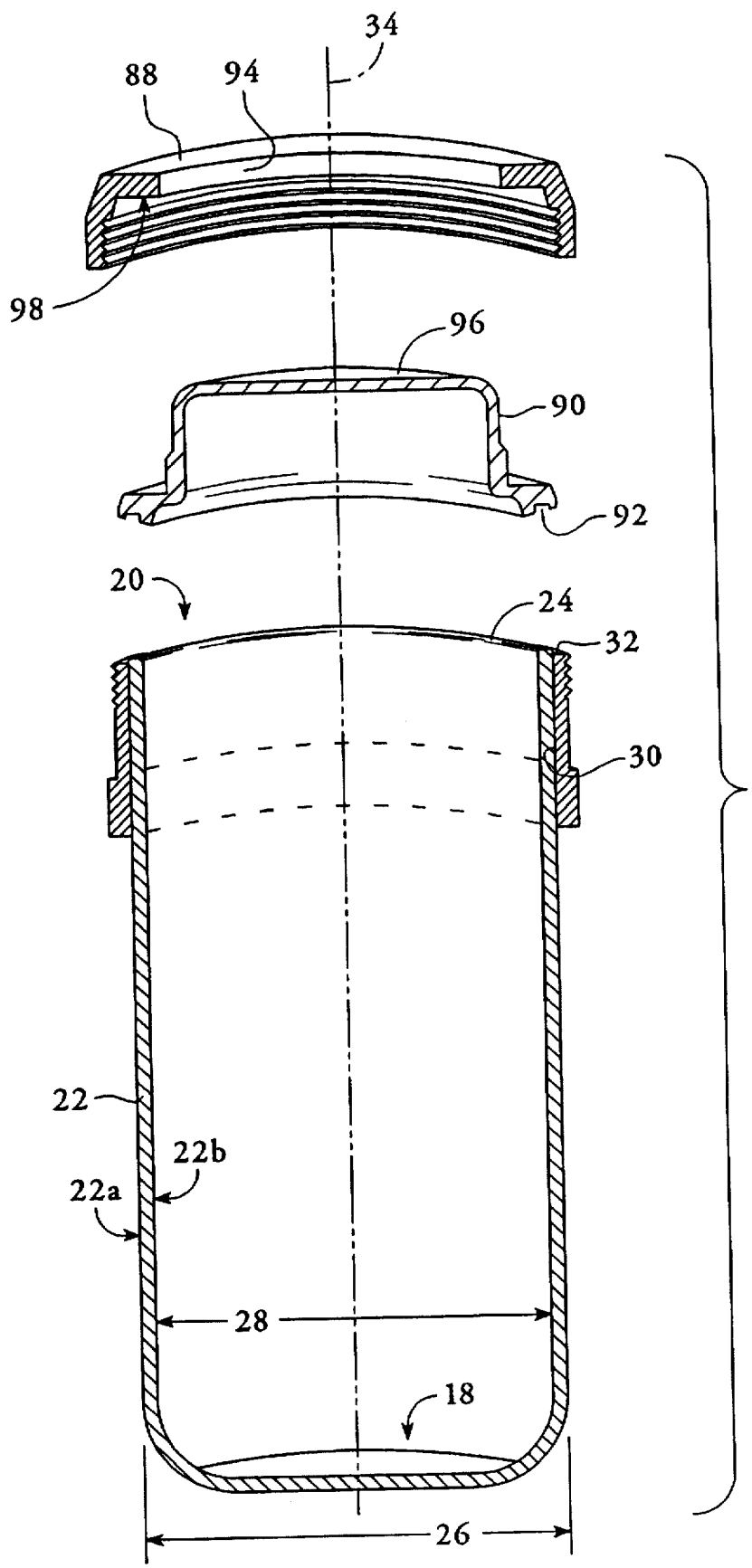
FIG. 2 is a side cross sectional exploded view of the hybrid fiber-composite centrifuge container shown in FIG. 1, in accord with the present invention.

FIG. 2 shows the fiber-composite base 12 having a closed end 18, an open 20 and a cylindrical wall 22 extending between the closed end 18 and the open end 20. The metal sleeve 14 is attached to the fiber-composite base 12 proximate to the open end 20, forming a sleeve-base interface therebetween. The cylindrical wall has an outer surface 22a, defining an outer diameter 26, and an inner surface 22b, defining an inner diameter 28. The outer diameter 26 may vary from being narrowest, proximate to the closed end 18, to being widest, proximate to the open end. In this fashion the fiber-composite base 12 would be tapered. The outer diameter may be uniform along the entire length of the cylindrical wall 22. It is preferred, however, that the outer diameter 26 generally define the widest portion of the fiber-composite base 12 and is uniform along the entire length of the sleeve-base interface. The metal sleeve 14 has a cylindrical shape with a smooth inner surface 30 defining a diameter matching the outer diameter 26. Regardless of whether the outer diameter is uniform, or varies along the length of the wall 22, it is preferred that the metal sleeve 14 be able to slide along the entire length of the fiber-composite base 12 from the closed end 18 to come to rest in a final seating position proximate to the open end 20.

In a final seating position, it is preferred that a terminus 32 of the metal sleeve 14 is co-planar with a perimeter 24 defined by the open end 20 of the fiber-composite base 12. The metal sleeve 14 extends away from the terminus 32, toward the closed end 18, the distance necessary to effectuate a seal with the closure dome 16. The smooth inner surface 30 of the metal sleeve 14 faces the outer surface 22a of the fiber-composite base 22 to create the interface therebetween. The smooth inner surface 30 was prompted by the discovery that having an inner surface with channels or ridges, for example the interlocking structure described in PCT application PCT/US92/09104, causes the fiber-composite base 12 to fail during centrifugation. In effect, stresses associated with centrifugation tend to focus proximate to the sharp corners of the channel or ridges, acting as a force amplifier. The amplification of the forces causes the fiber-composite base 12 to decouple from the sleeve 14.

Figure 3:
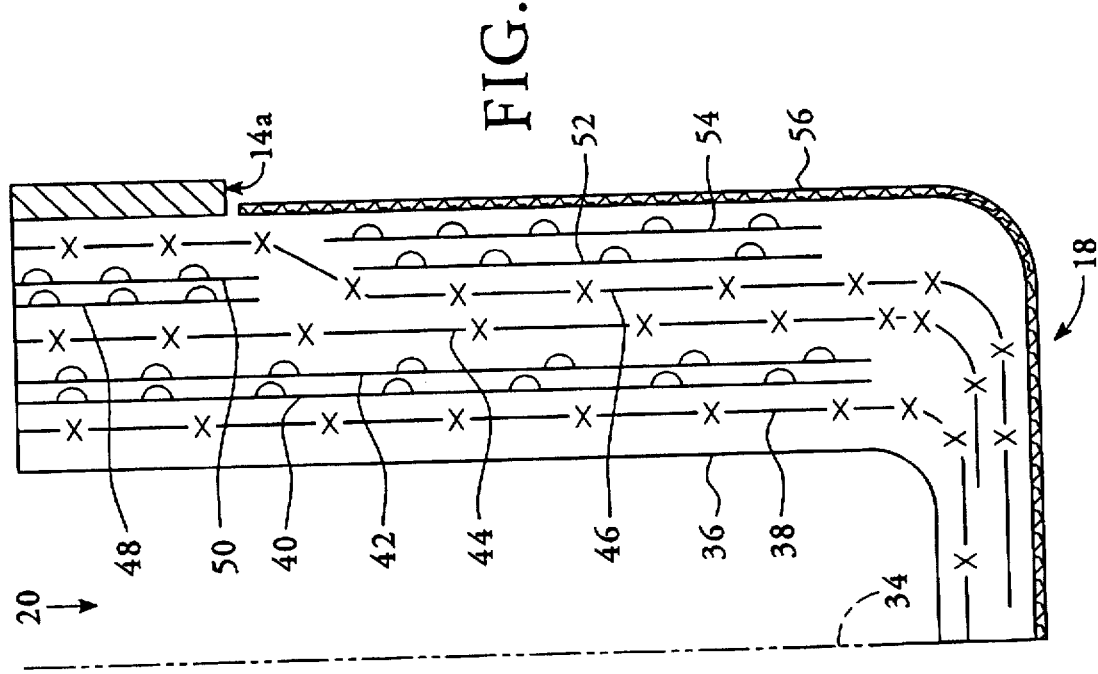
FIG. 3 a detailed view of a cylindrical wall of the hybrid fiber-composite centrifuge container shown in FIGS. 1 and 2, in accord with the present invention.
Figure 4:
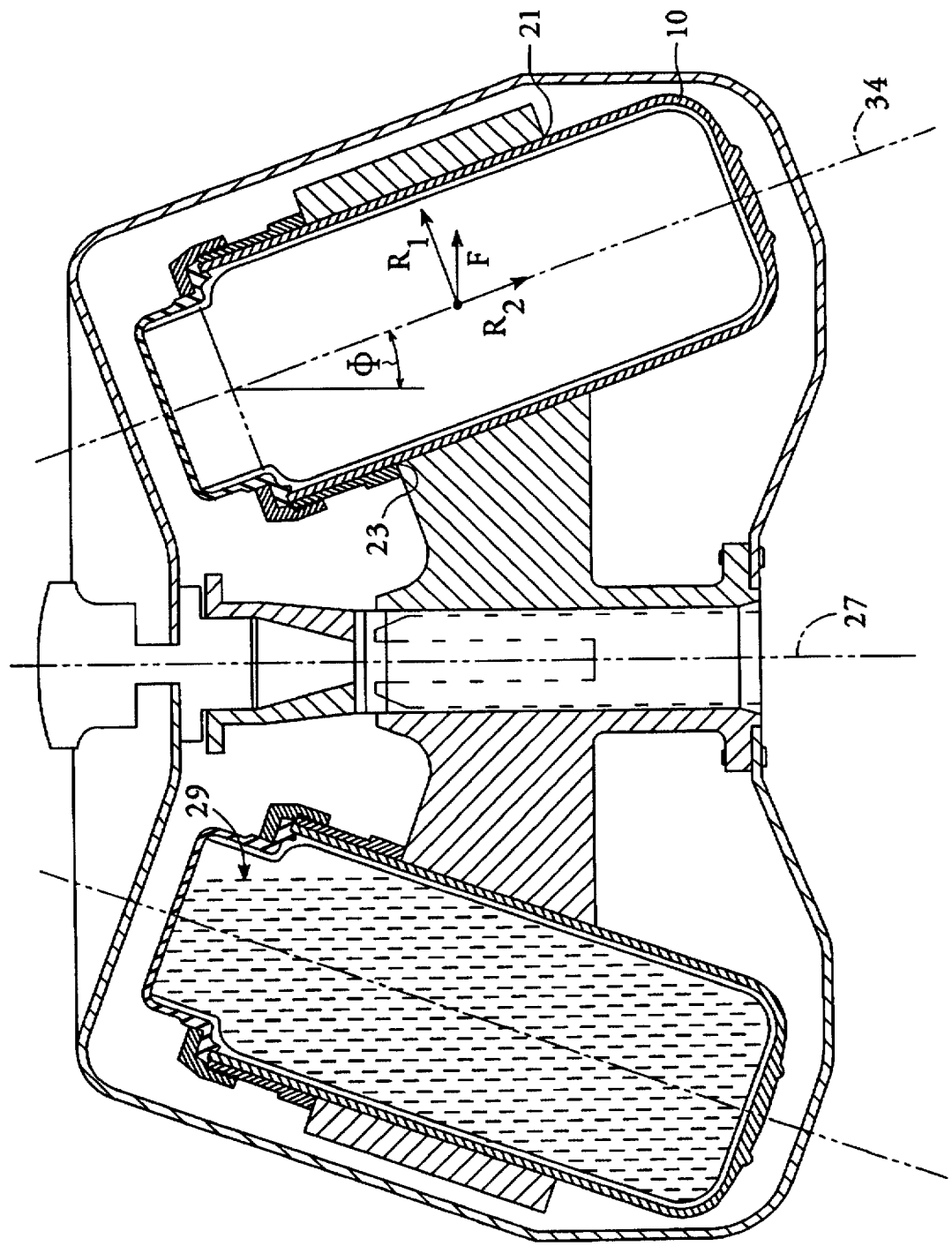
FIG. 4 a cross sectional side view of the hybrid fiber-composite centrifuge container shown in FIGS. 1 and 2 containing a liquid sample under centrifugation.

Referring to FIGS. 3 and 4, the fiber-composite base 12 is formed from strips of tow wound helically and circumferentially about an axis 34, forming a plurality of layers of tow. The layers are orientated in various directions with respect to the axis 34 and impregnated with an epoxy resin matrix. Each strip of tow includes a plurality of continuous fibers that are wound about the axis 34 as a unit. Typically, there are approximately 12,000 fibers in a strip of tow. The number and angle of the layers depends upon the forces that the container must withstand. During centrifugation, a resultant centrifugal load force F acts upon the container 10. In a fixed angle rotor where axis 34 lies at an angle $\phi$ with respect to a spin axis 27, the load force F can be resolved into two components $R_1$ and $R_2$, with $R_1$ acting normal to the axis 34, and $R_2$ acting parallel to the axis 34. These forces tend to cause container 10 to fail. Force $R_1$ tends to cause the cylindrical wall 22 to collapse and pulls the layers apart radially with respect to the axis. Proximate to the closed end, at point 21, $R_1$ creates a stress point. To avoid this stress point 21, it is preferred to taper the fiber composite base 12. In this fashion, the side wall 22 tapers inwardly at approximately 0.5° angle with respect to the interface between the metal sleeve 14 and the wall 22. The taper may run along the entire length of cylindrical wall 22. In the preferred embodiment, however, the taper commences proximate to closed end 18 on a portion of the cylindrical wall 22, housed in the rotor. In addition, $R_1$ creates a second stress point 23 proximate to the open end. $R_2$ causes a tensile stress that tends to pull the layers apart parallel to the axis. A substantial portion of the $R_2$ force is present on the metal sleeve 14's bearing surface 14a. It was recognized that the metal sleeve 14 could serve to distribute the forces on the bearing surface 14a, and at point 23 about the circumference of the base 12. To that end, the metal sleeve 14 extends along the cylindrical wall 22, a sufficient distance so that the force per unit area along the sleeve-base interface does not exceed the strength of the adhesive attaching the sleeve 14 to the base 12. To facilitate the redistribution of this localized force, it is preferred that the metal sleeve-rotor interface form a right angle with respect to the axis 34 of the container 10.

In addition, the container 10 must withstand internal hydrodynamic pressures produced by the sample in it. For example, the pressure of the a liquid 25 inside the container 10 can be defined as follows:

$$P = (\rho)(\omega)^2(R^2 - R_{men}^2)$$

where $\rho$ is the density of the liquid; $\omega$ is the rotation speed of a centrifuge rotor; R is the radius from the spin axis; and $R_{men}$ is the radius of the cylindrical meniscus 29. In addition, the pressure equation may further be complicated by a sedimentating sample further adding to the tumultuary of the pressure exerted on the container 10. To withstand these pressures, layers of tow are wound about the axis 34 at specified angles.

Referring only to FIG. 3, the preferred embodiment of the cylindrical wall 22 of the fiber-composite base 18 includes layer 36, consisting of an epoxy film adhesive that extends along the entire length of the cylindrical wall 22. Layer 36 facilitates holding layer 38 in a fixed position once it is placed upon layer 36. Layer 36 also functions as a bladder for the container fiber-composite base 12. Layer 38 is a strip of tow wound helically atop of layer 36, forming a ±15° angle with respect to the axis 34 thereto. Layer 38 is wound so as to completely enclose layer 36, acting as a primary layer for the fiber-composite base 12. Layer 40 is a strip of tow circumferentially wound on top of layer 38, forming a 90° angle with respect to the axis 34. Layer 40 is adjacent to layer 38, along the entire length of the cylindrical wall 22. Layer 42 is a strip of tow circumferentially wound on top of layer 40, forming a 90° angle with respect to the axis 34. Layer 44 is adjacent to layer 42, along the entire length of the cylindrical wall 22. Layer 44 is a strip of tow helically wound on top of layer 42, forming a ±45° angle with respect to the axis 34. Layer 46 is adjacent to layer 44 along the entire length of the cylindrical wall 22 and forms part of the closed end 18. Layer 46 is a strip of tow helically wound on top of layer 44, forming a ±15° angle with respect to the axis 34. Layer 46 forms a portion of the closed end 18; however, it is not adjacent to the preceding layer, layer 44, along the entire length of the cylindrical wall 22. Rather, proximate to the metal sleeve 14, layers 48 and 50 are interposed between layers 44 and 46. Layers 48 and 50 are strips of tow circumferentially wound atop of a portion of layer 44, coextensive with the metal sleeve 14. Layers 48 and 50 each forms a 90° angle with respect to the axis 34. In this manner, layer 46 forms the outer most layer of tow for the portion of the cylindrical wall 22, which is coextensive with the metal sleeve 14. Layers 52 and 54 form the outer most layers of tow for the remaining portion of the cylindrical wall 22. Layers 52 and 54 are circumferentially wound atop of the portion of layer 46 which is not coextensive with the metal sleeve 14, forming a 90° angle with respect to the axis 34. In this fashion, layer 46 defines a "lane-change" amongst the plurality of layers of tow. Layer 56 is a fiber sheet which provides a highly compliant exterior layer.

Figure 5:
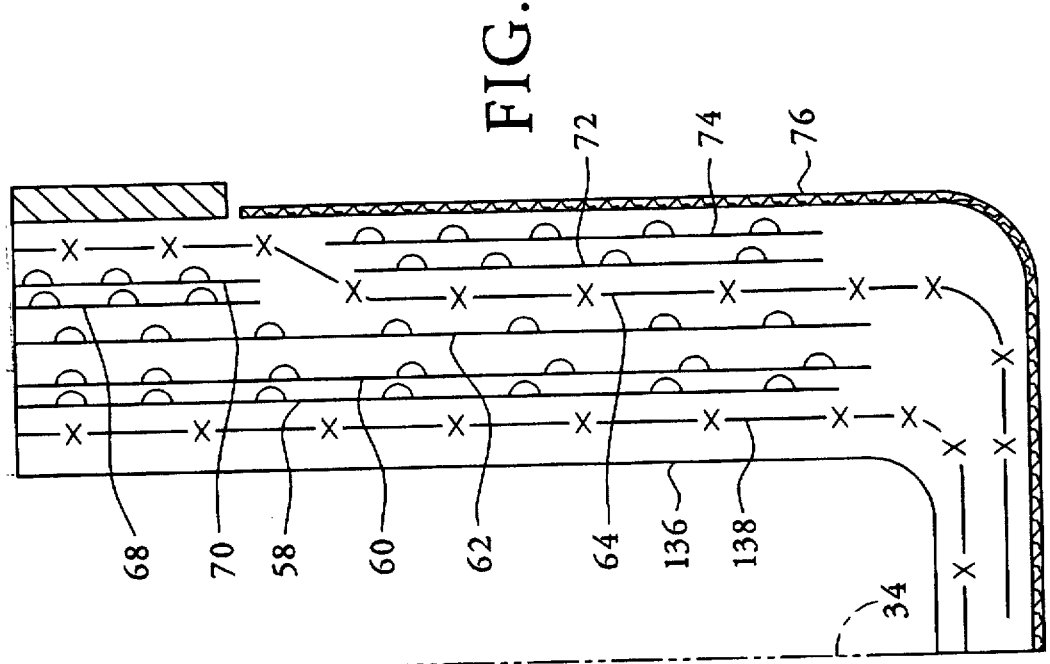
FIG. 5 a detailed view of a cylindrical wall of the hybrid fiber-composite centrifuge container shown in FIGS. 1 and 2, in accord with an alternate embodiment of the present invention.

FIG. 5 shows an alternate embodiment of the cylindrical wall 22. In this embodiment, the fiber-composite base 12 includes layer 136, consisting of an epoxy film adhesive that extends along the entire length of the cylindrical wall 22. As before, layer 136 facilitates holding layer 138 in a fixed position once it is placed upon layer 136. Layer 136 also functions as a bladder for the container fiber-composite base 12. Layer 138 is a strip of tow wound helically atop of layer 36, forming a ±15° angle with respect to the axis 34 thereto. Layer 138 is wound so as to completely enclose layer 136, acting as a primary support layer for the fiber-composite base 12. Layers 58, 60 and 62 are each a strip of tow circumferentially wound atop of layer 138, forming a 90° angle with respect to the axis 34 and extend coextensive with layer 138 along the entire length of the cylindrical wall 22. Layer 42 is a strip of tow circumferentially wound on top of layer 40, forming a 90° angle with respect to the axis 34. Layer 64 is a strip of tow helically wound on top of layer 62, forming a ±30° angle with respect to the axis 34. Layer 64 forms a portion of the closed end; however, it is not adjacent to the preceding layer, layer 62 along the entire length of the cylindrical wall 22. Rather, proximate to the metal sleeve 14, layers 68 and 70 are interposed between layers 64 and 62. Layers 68 and 70 are strips of tow circumferentially wound atop of a portion of layer 64, coextensive with the metal sleeve 14. Layers 68 and 70 each forms a 90° angle with respect to the axis 34. In this manner, layer 64 forms the outer most layer of tow for the portion of the cylindrical wall 22, which is coextensive with the metal sleeve 14. Layers 72 and 74 form the outer most layers of tow for the remaining portion of the cylindrical wall 22. Layers 72 and 74 are circumferentially wound atop of the portion of layer 64 which is not coextensive with the metal sleeve 14, forming a 90° angle with respect to the axis 34. In this fashion, layer 64 defines a "lane-change" amongst the plurality of layers of tow. Layer 76 is a fiber sheet which provides a highly compliant exterior layer.

The lane change feature overcomes two problems. It has been found that bonding a metal sleeve to a layer of tow circumferentially wound to form a 90° angle with respect to the axis 34 caused the fiber-composite base 12 to disintegrate during centrifugation. Such a layer becomes uncoiled due to axial stress, caused for example by the $R_2$ force discussed above with respect to FIG. 4. The shear stress arising from, inter alia, an axial force on the sleeve and/or internal pressures of the container, degraded the interface between the metal sleeve and fiber composite base, causing the 90° layer to uncoil. Bonding the metal sleeve 14 to a helically wound strip of tow, wound at either a 30° angle or a 15° angle overcame this problem. In addition, the lane change feature of layers 64 and 46 provide the added advantage of controlling the outer diameter of the interface between the metal sleeve 14 and the cylindrical wall 22. Specifically, in the preferred embodiment, the lane change feature facilitates having a uniform outer diameter 26 along the entire length of the sleeve-base interface.

Figure 6:
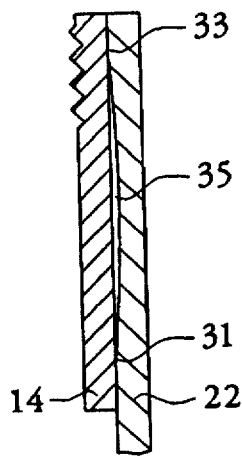
FIG. 6 is a schematic view demonstrating a problem overcome by the present invention.

It was found that the helical layer, which forms the interface between the metal sleeve 14 and cylindrical wall 22, must extend along the entire length of the cylindrical wall 22. Winding the helical layer so that it is merely coextensive with the interface creates localized stress points 31 and 33, as shown in FIG. 6. Points 31 and 33 were formed leaving a space 35 between the cylindrical wall 22 and the metal sleeve 14. Space 35 would typically fill with epoxy, causing the sleeve-base interface to fail, i.e., the metal sleeve 14 would detach and the fiber tow would uncoil. The present invention abrogates the space 35, thereby forming an interface having a uniform diameter.

Referring to both FIGS. 3 and 5, the lane change feature of layers 46 and 64 provides an additional advantage. It is known that layers of tow wound 90° about the axis 34 provides the greatest strength to withstand collapse of the fiber-composite base 12. However, it was found that providing the maximum distance between layers wound 90° about the axis provides additional strength. Therefore having layers 46 and 64 interposed between two layers of tow wound 90° about the axis 34 strengthens the cylindrical wall 22. The metal sleeve 14 provides additional strength to the portion of the cylindrical wall that is coextensive with it, thereby compensating for the absence of layers 46 and 64 between the layers wound 90° with respect to the axis 34.

Figure 7:
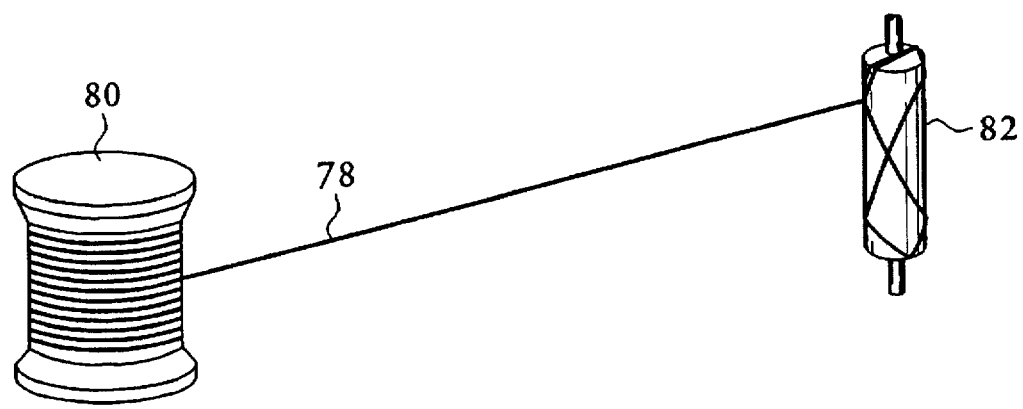
FIG. 7 is a simplified plan view showing apparatus for forming a fiber-composite base of the hybrid fiber-composite centrifuge container, in accord with the present invention.

Referring to FIG. 7, the tow 78 is shown housed on a spool 80. The fiber-composite base 12 is formed by wrapping the tow 78 about a smooth mandrel 82, having a profile matching the internal geometry of the fiber-composite base 12. The tow is wound about the mandrel forming a plurality of dry layers of tow orientated as described above with respect to FIGS. 3 and 5, defining a preform. After the requisite layers have been wound about the mandrel 82, the preform base is formed having two closed ends.

The inner surface of the metal sleeve is coated with epoxy film adhesive and is positioned on the dry fiber preform before impregnating it with epoxy. After the metal sleeve 14 is positioned properly, the fiber-composite base 12 is impregnated with epoxy, typically by vacuum assisted resin transfer molding. More particularly, the dry fiber-composite base is placed in a sealed molding chamber, which is generally cylindrical defining the external diameter of the finished base. The molding chamber is evacuated and epoxy resin is introduced into the molding chamber under pressure. The pressure forces the epoxy resin into the crevices in the tow, fully impregnating it. The epoxy is heat cured, which simultaneously hardens the fiber-composite base 12 and bonds the metal sleeve to it.

Figure 8:
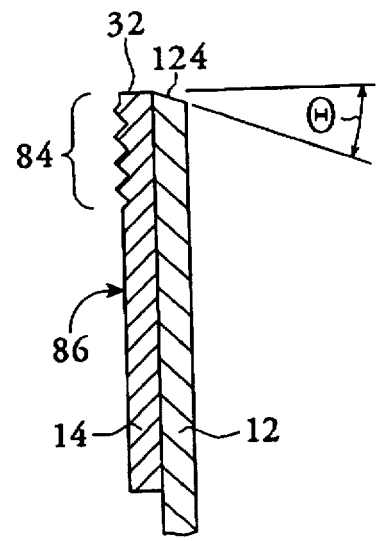
FIG. 8 is a detailed cross sectional side view of an open end of the hybrid fiber-composite centrifuge container, in accord with an alternate embodiment of the present invention.

Referring to FIG. 8, there are numerous advantages to having the hybrid container 10 having a fiber-composite base and metal sleeve. The metal sleeve 14 allows close tolerance machining of the container without damaging the base, permitting construction of an interface compatible with laboratory equipment, as desired. For example, threads 84 may be formed on the outer surface 86 of the metal sleeve 14. This permits machining of the container after it has been fabricated, which is particularly useful as the geometry of the metal sleeve 14 and the base 12 often change during the curing process. In addition, the metal sleeve 14 may provide further protection to the open end 20 of the fiber-composite base 14 by providing a slight angle to the perimeter 124. In this manner, the perimeter 124 will slope toward the axis 34 at a specified angle θ with respect to the terminus of the 32 metal sleeve 14. Typically, the angle θ may range from 1° to 90° with the preferred angle being 20°. This reduces the susceptibility of the perimeter 124 to abrasive forces.

Referring also to FIG. 2, to further reduce abrasive forces that may be present on the perimeter 24 or 124, a domed enclosure 16 having a rotatable collar 88 and a lid 90. The lid includes an annular groove 92 having a diameter matching the diameter of the perimeter 24. In this fashion, a gasket (not shown), e.g., 0-ring, is placed atop of the perimeter. The lid 90 sets atop of the perimeter with the gasket disposed between the groove 92 and the perimeter 24. The rotatable collar includes an aperture 94 which through which the dome 96 portion of the lid 90 passes and a bearing surface. The rotatable collar 88 may include a mounting surface, such as threads 100 which are complementary to the mounting surface of the metal sleeve 14, such as threads 84. As the rotatable collar 88 forms an interference fit with the metal sleeve 14, the bearing surface applies a downward force onto the groove 92, forming a hermetic seal with the perimeter 24 via a gasket. Neither the gasket nor the lid 90 rotates so as to create abrasive forces on the perimeter 24. Only the collar 88 creates abrasive force, e.g., by rotating. However, these forces are incident only upon the metal sleeve 14. In this fashion, the metal sleeve shields the fiber-composite base 12 from abrasive frictional forces, thereby providing the container 10 with a longer operational life.

Figure 9:
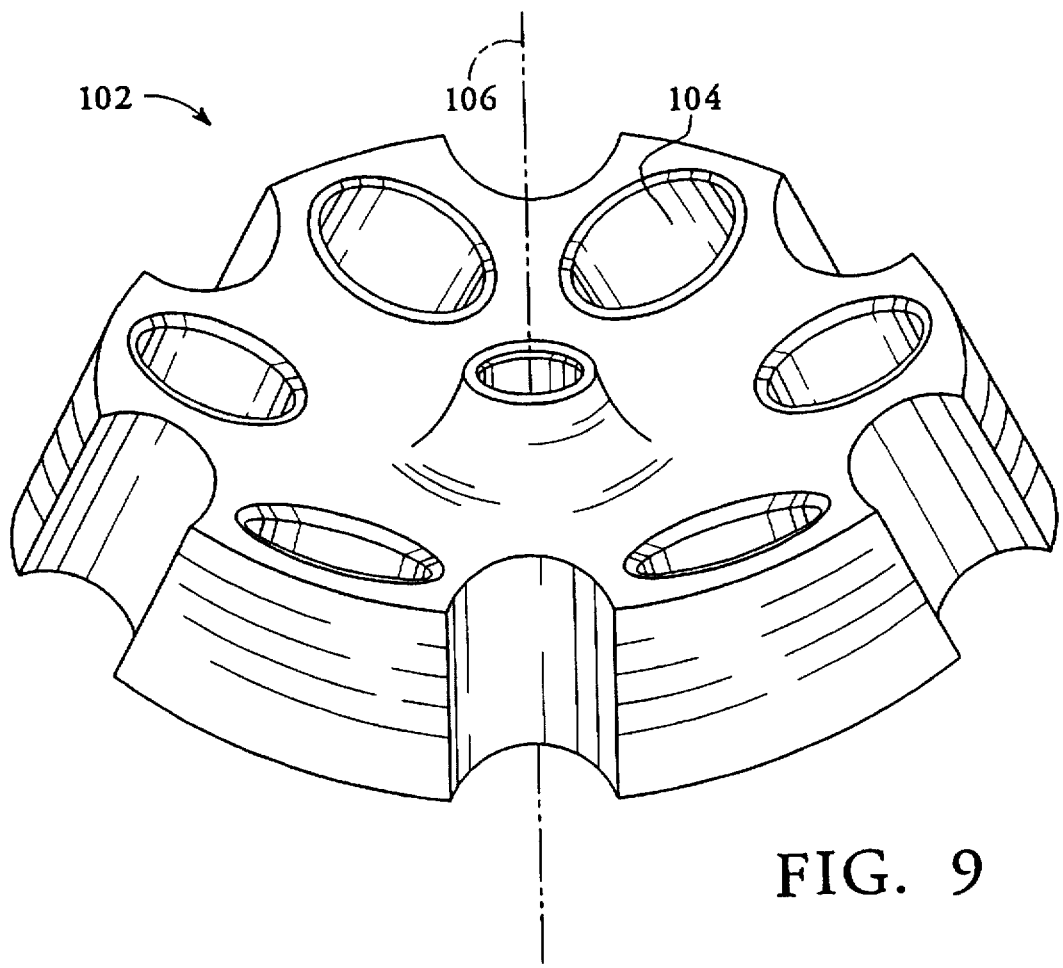
FIG. 9 is a perspective view of a rotor to be used with the hybrid fiber-composite centrifuge container in accord with the present invention.

Referring to FIG. 9, the hybrid composite container 10 provides additional advantages to a rotor. The lightweight structure of the centrifuge container reduces the structural requirements of a rotor which supports the centrifugal loading of the containers. This in turn reduce the moment of inertia of the rotor, resulting in faster acceleration and deceleration of the rotor. This reduces the power requirement of the drive system while increasing the maximum angular velocity. It is preferred to use the container with a fiber composite fixed angle rotor 102. The container is removably mounted into a slot 104 on the rotor 102. Each slot 104 is sloped toward a spin axis 106 forming an angle in the range of 0° to 45° therewith.

We claim:

1. A centrifuge container comprising:

a plurality layers of fiber material wound helically and circumferentially about an axis, defining a receptacle capable of resisting deformation due to hydrodynamic pressures associated with centrifugation of liquids contained therein, said receptacle having a closed end, an open end and a cylindrical wall extending between said open and closed ends, said wall having inner and outer diameters;

a metal sleeve for distributing load forces about a circumference of said receptacle, said metal sleeve having two opposed ends, each defining an aperture with said open end of said receptacle fitting into and contained within one aperture, forming an interface between said metal sleeve and said cylindrical wall; and means, permanently coupled to said base, for preventing uncoiling of said plurality of layers of fiber material during centrifugation, said means for preventing uncoiling including a layer of double-helically wound fiber defining a lane-change layer, a first portion of which is positioned between two layers of wound fiber, said first portion followed by a second portion positioned between one of said two layers of wound fiber and said metal sleeve so as to rest against said metal sleeve without spaces being present therebetween.

2. The centrifuge container as recited in claim 1 wherein said outer diameter of said receptacle varies along a length of said receptacle with said outer diameter being widest and uniform along said interface, and most narrow proximate to said closed end, defining a tapered receptacle.

3. The centrifuge container as recited in claim 1 wherein said metal sleeve includes a smooth inner surface facing said receptacle, with said inner surface being permanently coupled to said receptacle proximate to said open end.

4. The centrifuge container as recited in claim 1 wherein said open end defines a perimeter lying along a plane perpendicular to said wall, said metal sleeve including a terminus, lying in said plane, with said metal sleeve extending away from said plane toward said closed end covering a portion of said base, defining a sleeve portion, said perimeter extending downwardly toward said axis at a specified angle.

5. The centrifuge container as recited in claim 1 wherein said open end defines a perimeter lying along a plane perpendicular to said wall, said metal sleeve including a terminus, lying in said plane, with said metal sleeve extending away from said plane toward said closed end covering a portion of said base, defining a sleeve portion, said perimeter extending downwardly toward said axis, defining an angle in the range of 15° to 20° with respect to said plane.

6. The centrifuge container as recited in claim 1 wherein said wall has inner and outer diameters with said outer diameter being uniform along the entire length of said wall.

7. The centrifuge container as recited in claim 1 wherein said lane-change layer forms a 15° angle with respect to said axis.

* * * * *